(12) United States Patent
Obasanjo et al.

(10) Patent No.: US 8,296,356 B2
(45) Date of Patent: Oct. 23, 2012

(54) RATING BASED ON RELATIONSHIP

(75) Inventors: Oludare Obasanjo, Renton, WA (US);
Bhupinder S. Sethi, Redmond, WA (US); David A. Nichols, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 51 days.

(21) Appl. No.: 11/897,781

(22) Filed: Aug. 31, 2007

(65) Prior Publication Data
US 2009/0063630 A1 Mar. 5, 2009

(51) Int. Cl.
*G06F 15/16* (2006.01)
*G06Q 30/00* (2012.01)

(52) U.S. Cl. ..................... 709/203; 705/26.7
(58) Field of Classification Search .......... 709/203; 705/26.7
See application file for complete search history.

(56) References Cited

U.S. PATENT DOCUMENTS

| | | | |
|---|---|---|---|
| 6,839,690 B1 | 1/2005 | Foth et al. | |
| 7,143,089 B2 * | 11/2006 | Petras et al. | 707/749 |
| 7,703,030 B2 * | 4/2010 | Smirin et al. | 715/765 |
| 7,818,394 B1 * | 10/2010 | Lawler et al. | 709/217 |
| 7,822,631 B1 * | 10/2010 | Vander Mey et al. | 705/7.29 |
| 2001/0039508 A1 | 11/2001 | Nagler et al. | |
| 2005/0144052 A1 | 6/2005 | Harding et al. | |
| 2005/0192958 A1 | 9/2005 | Widjojo et al. | |
| 2006/0009994 A1 * | 1/2006 | Hogg et al. | 705/1 |
| 2006/0021009 A1 * | 1/2006 | Lunt | 726/4 |
| 2006/0042483 A1 | 3/2006 | Work et al. | |
| 2006/0212355 A1 | 9/2006 | Teague et al. | |
| 2006/0271281 A1 * | 11/2006 | Ahn et al. | 701/208 |
| 2007/0143128 A1 * | 6/2007 | Tokarev et al. | 705/1 |
| 2008/0005064 A1 * | 1/2008 | Sarukkai | 707/3 |
| 2008/0275719 A1 * | 11/2008 | Davis et al. | 705/1 |
| 2009/0299819 A1 * | 12/2009 | Davis et al. | 705/10 |

OTHER PUBLICATIONS

"Online Reputation Management", Date: 2006, pp. 1-15.
Buskens Vincent, "Social Networks and the Effect of Reputation on Cooperation", Date: Mar. 30, 1998, pp. 1-18.
Hogg, et al., "Enhancing Reputation Mechanisms via Online Social Networks", Proceedings of the 5th ACM conference on Electronic commerce, Date: May 17-20, 2004, pp. 236-237, ACM Press, New York, USA.
Josang, et al., "A Survey of Trust and Reputation Systems for Online Service Provision", Date: 2006, pp. 1-43.
Kuchinskas Susan, "Social Credit Points Rack Up Online", http://www.internetnews.com/bus-news/print.php/3497871 , Apr. 14, 2005, 3 pages.
Sabater, et al., "Reputation and Social Network Analysis in Multi-Agent Systems", Date: Jul. 15-19, 2002, pp. 475 — 482, ACM Press, New York, USA.

* cited by examiner

Primary Examiner — George C Neurauter

(57) ABSTRACT

People often trust ratings provided by those with whom they have an existing relationship more than they would trust ratings provided by strangers. A system that provides ratings can combine the ratings with information about a person's social network, in order to provide information that a person seeking the rating may find more reliable. The information provided to a person may, in some manner, differentiate between ratings that were provided by members of the person's social network and ratings that were provided by those outside of the persons' social network.

13 Claims, 5 Drawing Sheets

Seller: JDoe
Overall rating: 8.5/10
In-network rating: 2.1/10
Rated by these people in your network:
  FredS, LJones, RichB
  click here to see their individual ratings of JDoe

| Items offered by sellers with ratings in your network: | | | | |
|---|---|---|---|---|
| Item | Seller | Bid price | Positive ratings of this seller from within your network | |
| Chair | Smith | $200 | 5 (click to see) | |
| MP3 Player | Jones | $29 | 0 (click to see) | |
| Toaster | Martin | $56 | 3 (click to see) | |

RATING BASED ON RELATIONSHIP

BACKGROUND

In on-line services or communities, it is common to offer some kind of rating system. For example, an on-line marketplace can allow its participants to rate buyers or sellers (e.g., "rate your experience with this seller on a scale of one to ten"), or to rate specific items, services, businesses, etc. Question-and-answer services may allow participants to rate each other based on how well they answer questions. A user of such a service, or a participant in the community, normally has the opportunity to view the ratings. Thus, a buyer in an on-line marketplace who is contemplating entering into a transaction with a particular seller can obtain a report on other people's experience with the seller, such as "previous buyers have given this seller an average rating of 8.7 on a scale of one to ten."

In a community that is not on-line, people have traditionally sought information about services, merchants, items, etc., through recommendations of friends or acquaintances. Due to the trust that may be established through a pre-existing personal relationship, a person may place more weight on opinions offered by friends and acquaintances than he or she would place on the opinions of strangers. Thus, if a person is seeking opinions on a car dealer, a building contractor, a restaurant, etc., he or she may be more likely to put trust in the opinions of his or her friends or acquaintances than in the public at large. On-line rating systems typically provide ratings that are partly or wholly based on the opinions of people who are unknown to the person who is using the rating.

Moreover, ratings in on-line rating systems are often subject to certain systemic biases. For example, in an on-line marketplace, a buyer may be given the chance to rate a seller once per transaction, so the aggregate rating of the seller may be skewed toward the opinions of buyers who buy frequently from that seller. Additionally, cliques of participants in the marketplace (or in any other community in which ratings are offered) can agree to rate each other highly, thereby artificially inflating each other's overall ratings. Regardless of the circumstances under which a rating is generated, on-line rating system generally encourage those seeking information to rely on the opinions of strangers, which is not in line with the traditional practice of seeking word-of-mouth advice from those whom one knows.

SUMMARY

A rating system can leverage existing social networks to provide valuable information to a user of the rating. A participant in an on-line community may belong, either explicitly or implicitly, to a social network (or other type of network). The network may be based on who is in the participant's contact list, on who is in a list of "friends" that the participant has specified, on who went to the same college as the user, or on any other kind of relationship. The social network can further be extended to include n-th degree relationships (e.g., friends of friends, friends of friends of friends, people in a contact list of a friend, etc.). To the extent that one may place more weight on the opinions of those in his or her social network than he or she would on the opinions of strangers, the rating system can provide a rating that takes into account the relationships between the person who seeks the rating and the people who provide the ratings.

The rating system may take these relationships into account in a variety of ways. For example, the rating system can filter rating data to provide a user with rating information generated by those in the participant's social network and/or to omit rating information of those who are not in the participant's social network. Or, in the example of an on-line marketplace, items for sale can be filtered to show the user those items sold by sellers who have been rated by those in the user's social network. As another example, an average rating can be provided that weighs different rater's opinions differently depending on whether there is a relationship between the rater and the user, and/or the degree of that relationship.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4 is a block diagram of an example user interface that provides rating information based on network information.

FIG. 5 is a block diagram of an example user interface in which rating information and network information are used to filter a list of items for sale.

DETAILED DESCRIPTION

A participant in an on-line community, or a user of an on-line or other software application, may have one or more social networks. It may be the case that a person places greater trust in members of his or her social network than he or she would place in members of the general public. Thus, social networks can be used to enhance the use of ratings, by combining raw rating data with information about whose ratings the user is likely to trust.

Figure 1:
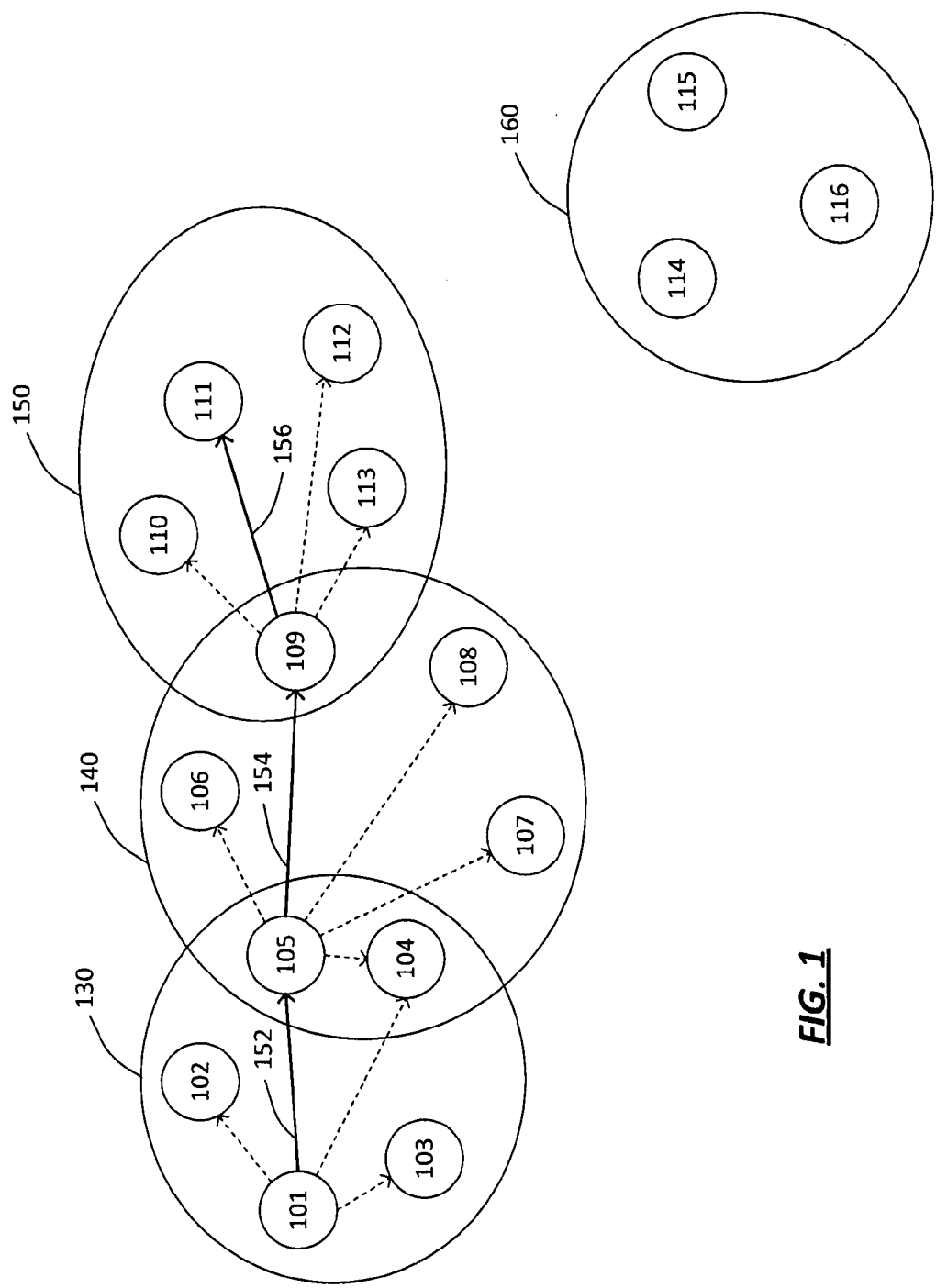
FIG. 1 is a block diagram of social networks and their members.

FIG. 1 shows relationships among participants in several networks. Networks 130, 140, 150, and 160 each comprise various users. (Since the participants in an on-line community in which social networks are defined are typically computer users, the people in the example of FIG. 1 are described, for convenience, as "users." However, these people need not be users in the traditional sense, and could also be operators, administrators, or people acting in any role.) The networks may, for example, be "social" networks based on personal relationships among users, or based on some common aspect or experience. For example a network can be defined based on people in a user's contacts list, friends list, Instant Messaging (IM) "buddies" list, users who live on the same street, users who attended the same college, etc. Any type of relationship can be used to define a network. It may be convenient to view these types of networks as being "social networks," based on human/social relationships. However, the subject matter described herein can be applied to groupings of users based on any type of relationship among those users, regardless of whether the relationship can be described as "social." Networks 130, 140, 150, and 160 may each be defined based on any kind of relationship among particular users. Moreover, the relationships that define these networks can be the same for all of the networks shown, or can be different for the different networks. For example, networks 130, 140, 150, and 160 may all be defined based on the "friends" lists of one of each network's members. Or, as another example, one network may be defined based on the names of people in one of the member's friends lists, another may be defined based on its members' having gone to the same school, another based on its members' living on the same street, etc.

Networks can be delineated based on directional or mutual relationships. For example, user 101 may have a contacts list that includes users 102, 103, 104, and 105, and network 130 may be defined, from the perspective of user 101, based on which other users are in his or her contacts list. If, for example, user 101 is not in user 102's contact list, then one understanding of the concept of a network (the directional sense) is that user 102 is in user 101's network, but user 102 is not in user 101's network. In this case, network 130 is defined from user 101's perspective based on his or her contact list. However, delineating the boundaries of a network based on user 102's contact list would result in a different network than network 130 (i.e., one that does not include user 101). As another example, users 101, 102, 103, 104, and 105 may have attended the same college as each other, in which case these users are in the same network based on a property that is mutually true for all of them (i.e., the property of having attended a particular college). This situation is an example of a network in the mutual sense. The subject matter described herein relates to networks, whether such networks are based on directional relationships, mutual relationships, or any other type of relationship.

Network 130 comprises users 101, 102, 103, 104, and 105. Network 140 comprises users 104, 105, 106, 107, 108, and 109. Network 150 comprises users 109, 110, 111, 112, 113. Network 160 comprises users 114, 115, and 116. Users 104 and 105 are members of both network 130 and network 140. User 109 is a member of both network 140 and network 150. Network 160 has no members in common with any of the other networks shown.

Based on overlap of membership among some of the networks, it is possible to describe a concept of the degree of a relationship. Users 101 and 105 are both in network 130, and line 152 indicates a connection between these users within a single network. The fact that these two users are in the same network 130 indicates a first-degree relationship between the users. Users 101 and 109 are not in the same network as each other, but user 109 is in user 105's network, and user 101 is in user 105's network. Thus, user 101 is connected to user 109 through user 105 (as indicated by lines 152 and 154), and the relationship between user 101 and 109 can be described as a second-degree relationship. Similarly, there is a relationship between user 101 and 111 (as indicated by lines 152, 154, and 156), and this relationship can be described as a third-degree relationship. Since network 160 is isolated from the other networks shown, the members of that network (users 114, 115, and 116) do not stand in a discernible relationship with users 101-113.

Figure 2:
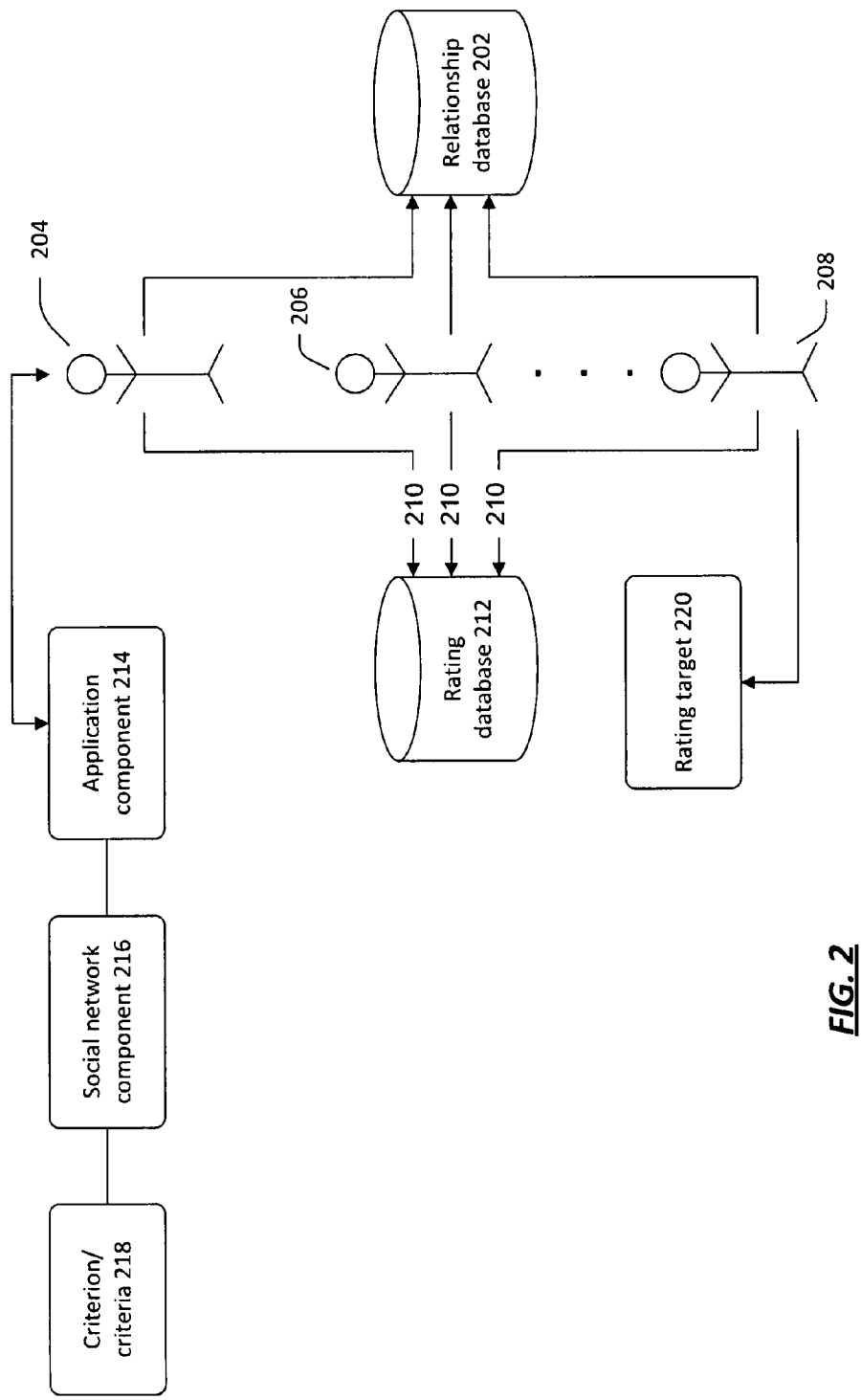
FIG. 2 is a block diagram of example components that may store and/or use rating and social network information.

The networks defined by relationships among users can be collected and stored in a relationship database 202, such as that shown in FIG. 2.

FIG. 2 shows a system in which social network and rating information may be collected and used. Users 204, 206, and 208 (who may be similar to the users 101-116 shown in FIG. 1) create and/or provide relationship information, which may be stored in a network database. For example, when users create contacts lists, friends lists, IM buddies lists, etc., this information may be collected and stored in relationship database 202. In addition to the information that users 204, 206, and 208 provide to define their relationships explicitly (e.g., by including other users in a friends list), information may be collected about these users and may be used to define relationships apart from the user's explicit statement of whom his relationships are with. For example, it may be determined through explicit questioning of users, data mining, etc., that user 204 is an alumnus of a particular college or lives in a particular city. This information may be used to place user 204 in a network that includes alumni of that college or residents of that city, and user 204's membership in that network may be recorded in relationship database 202.

Users 204, 206, and 208 may also provide rating information 210 that may be stored in rating database 212. An object, thing, service, product, person, etc., that can be rated can be described as a "rating target" 220. Cars, restaurants, Internet Service Providers, other users, etc., are examples of rating targets. Some rating targets are people (e.g., a seller, a person who offers an answer to a question, etc.), but some rating targets are non-people (e.g., restaurants or other businesses, cars, etc.). When users rate rating targets (e.g., when user 208 rates rating target 220), this rating information can be stored in rating database 212. For example, rating database may store raw rating data, such as the identity of a user who provided the rating, what target was being rated, and the rating itself (e.g., "user 208 rates Joe's Restaurant four out of ten stars" is an example of such raw rating data).

Application component 214 is a component that makes use of rating information to provide information to a user. For example, user 204 may communicate with application component 214 to request and obtain rating information (as indicated by the arrow connecting user 204 with application component 214.) Examples of systems that can be implemented with application component 214 include: an on-line marketplace that enables participants to buy and sell items, and that provides a mechanism for rating buyers, sellers, items for sale, etc.; a web site that facilitates a question-and-answer community, in which users rate each other's performance in answering questions; a review and/or opinion web site, in which users provide ratings of products, services, movies, etc. In addition to these examples, application component 214 could also be a different type of component.

Application component 214 communicates with rating database 212 in order to obtain ratings. Additionally, application component 214 communicates with social network component 216, which identifies users as being part of a social network. Social network component 216 obtains, from relationship database 202, data on relationships among users. Social network component 216 uses a criterion (or plural criteria) 218 to determine what type of relationship constitutes two users being in the same network. For example, criterion/criteria 218 may say that B is in A's social network if B appears in A's contact list, if B went to the same college as A, etc. Application component 214 provides information to a user based on rating information from rating database 212, and on information about which users are in a common social network as reported by social network component 216. However, the nature of the information that application component 214 provides to a user depends on what functionality application component 214 is designed to implement.

For example, if application component 214 implements an on-line marketplace, then application component 214 may combine rating information with social network information to provide the user with the average score that members in the user's social network have given to a seller, or to provide the user with a list of items sold by sellers who have been rated by members of the user's social network. As another example, if application component 214 implements a web site that provides reviews and opinions on products, then application component 214 may provide the average rating that members of a particular user's social network have given to a product.

It should be noted that FIG. 2 shows various functional components as being separate entities, but the functionalities represented by these components could be apportioned differently from what is shown. For example, relationship database 202 and rating database 212 could be a single database. As another example, social network component 216 can be separate from application component 214 as shown, but can also be part of that component. The various functionalities shown in FIG. 2 can be arranged or implemented in any manner.

Figure 3:
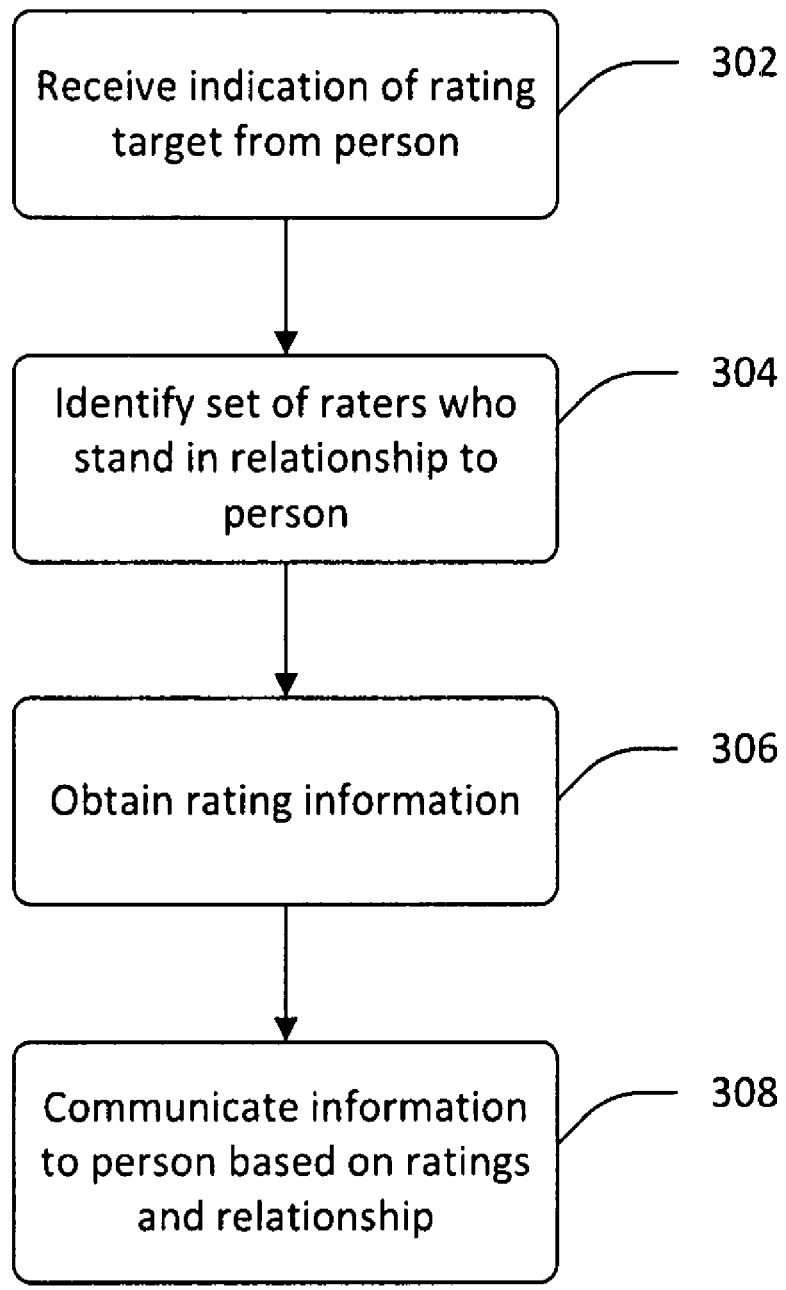
FIG. 3 is a flow diagram of an example process of providing or using rating information.

FIG. 3 is a flow diagram of an example process of providing using rating information. In FIG. 3, the various stages of a process are shown as occurring in a particular order, as indicated by lines connecting blocks, but these stages may occur in any order, and in any combination or sub-combination. Moreover, the stages of FIG. 3 may be carried out in the system shown in FIG. 2, but may also be performed in any system.

At 302, an indication is received of a rating target for which a rating is to be obtained. As previously noted, this target can be a person, an object, a service, a product, a business, or any object that can be rated. One example of receiving an indication of the target to be rated is when a user asks for a rating of a specific person, product, service, business, etc. A seller in a potential purchase transaction is an example of a rating target (e.g., a buyer might want to obtain ratings of such a seller before entering into the transaction), but the rating target could be a person in some other context (e.g., someone seeking an answer to a question might want to obtain ratings of the person answering the question before accepting that person's answer), or could be a non-person such as a restaurant, a car, etc.

At 304, a set of rater(s) who stand in a given relationship to a particular user is identified. For example, if a particular user has requested a rating of a target, then a set of users can be identified that stand in a particular relationship to the requesting user. The relationship in question can be any type of relationship, such as a social networking relationship of n or fewer degrees. For example, social networks could be defined based on who is in a user's contact list, or which users attended the same school, and the relationship referred to at 306 could be all raters that are within two degrees of the user who has requested a rating (e.g., friends of A (degree one), and friends of friends of A (degree two)). Thus, if user A's contact list contains user B, whose contact list contains user C, then A has a two-degree relationship with C and could be included in the set of users that stand in the given relationship to C. If A's contact list contains D, who attended the same school as E, then a two-degree relationship between A and E can also be said to exist and E can also be included in the set.

At 306, rating information for the target is obtained. For example, the rating information may be obtained from rating database 212 (shown in FIG. 2).

At 308, information is communicated to the user based on the ratings obtained at 306, and on the set identified at 304. This information may differentiate, in some manner, between members of the set identified at 304 and members outside of this set, and/or may differentiate between the ratings between these two groups. As discussed above, people tend to differentiate between opinions of those they know and opinions of strangers. Differentiation between different participants of an on-line community based on what kind of relationship they have with a person who is seeking a rating may reflect the practice that people employ in a non-on-line setting.

The information communicated to a user, and the way that the information differentiates among different users, can take various forms. For example, the ratings of the rating target may be divided based on whether the ratings were provided by members of the set identified at 306, or by other raters. FIG. 4 shows an example of this situation. FIG. 4 shows a rating 400 of a seller, in the form of a user interface that may be displayed as part of an on-line application. The seller may, for example, be a seller in an on-line marketplace. Rating 400 shows the seller's user-id ("JDoe"), and lists an overall rating as a number (8.5 out of 10, based on raters in general) and an "in-network" rating (2.1 out of ten) representing the opinions of members of the set identified at 306. As can be seen, in this example members of the set determined at 306 tend to have a different opinion of the seller than do raters in general. The rating may also include more specific information, such as which people in the user's network rated the seller, and may offer a link to allow the user to see those persons' ratings of the seller.

Another example of the kind of information that can be communicated is shown in FIG. 5. List 500 (which is shown in the form of a user interface, as it could be displayed by an on-line application) is a list that contains identifications of items offered by sellers who have been rated by those who stand in a particular relationship to the one for whom the list has been prepared. For example, an on-line marketplace may offer the option to search for items that are being offered for sale by sellers that have been rated within a given buyer's social network. Thus, the information provided is a filtered list of items for sale, which includes those items offered by sellers that have ratings from members of the buyer's social network. The information shown in FIG. 5 differentiates between members of the set defined at 306 and those who are outside that set, in the sense that the list is made up of items offered by sellers that have been rated by members of the set, but does not include items offered by sellers that have not been rated by members of the set. The list may also include more specific information, such as how many members of the buyer's network gave positive ratings to the seller of each item. The list may also offer links to each of these ratings.

Another way that information based on the ratings can be provided to the user is to perform a computation that calculates some type of aggregate of ratings (e.g., an average, sum, etc.), where the aggregate is weighted based on the relationship of the rater to the person requesting the rating. For example, as the degree of relationship between the rater and the person requesting increases, the weight of that rater's rating may decrease in the calculation. As another example, ratings may count in the calculation if they come from raters who are within n degrees of the person seeking the rating, and otherwise may be disregarded in the calculation. In one example, raters who are within n degrees of the person seeking the rating may have their ratings weighted the same, and ratings may be reduced to a zero weight if they are from raters who are more than n degrees from the person seeking the rating.

Figure 6:
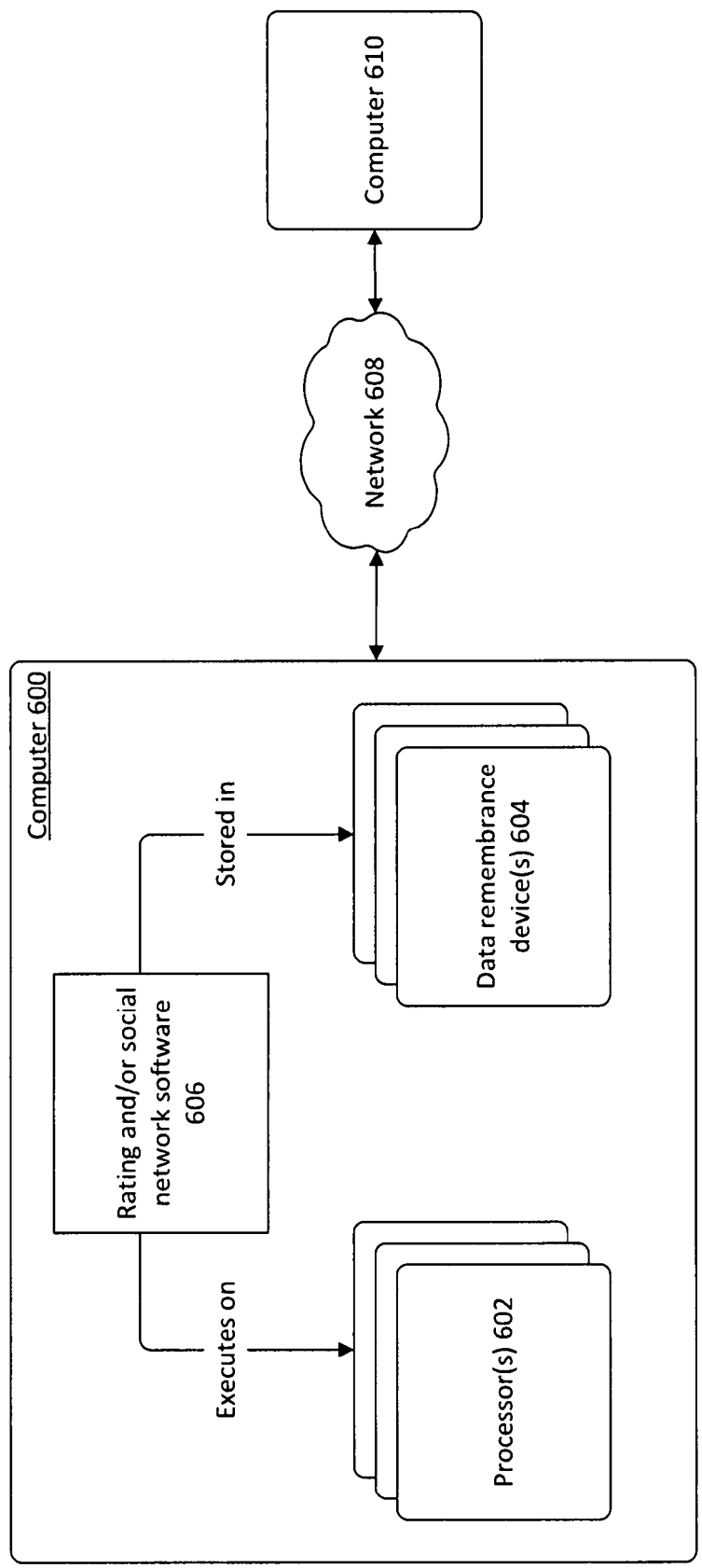
FIG. 6 is a block diagram of example components that may be used to implement aspects of the subject matter described herein.

FIG. 6 shows an example environment in which aspects of the subject matter described herein may be deployed.

Computer 600 includes one or more processors 602 and one or more data remembrance devices 604. Processor(s) 602 are typically microprocessors, such as those found in a personal desktop or laptop computer, a server, or a handheld computer. Data remembrance device(s) 604 are devices that are capable of storing data for either the short or long term. Examples of data remembrance device(s) 604 include hard disks, removable disks (including optical and magnetic disks), volatile and non-volatile random-access memory (RAM), all types of read-only memory (ROM), flash memory, magnetic tape, etc. Data remembrance device(s) are examples of computer-readable storage media.

Software may be stored in the data remembrance device(s) 604, and may execute on the one or more processor(s) 602. An example of such software is rating and/or social network software 606, which may implement some or all of the functionality described above in connection with FIGS. 1-5. Software 606 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance device(s) 604 and that executes on one or more of the processor(s) 602. As another example, the subject matter can be implemented as software having instructions to perform one or more acts, where the instructions are stored on one or more computer-readable storage media.

In a typical environment, computer 600 may be communicatively connected to one or more other devices through network 608. Computer 610, which may be similar in structure to computer 600, is an example of a device that can be connected to computer 600, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of providing a rating comprising:
using a processor to perform acts comprising:
receiving, from a first person, an indication of a rating target, wherein said rating target is an object, a thing, a service, a product, or a second person other than said first person;
identifying a first set of one or more raters that stand in a relationship to said first person and that have rated said rating target;
communicating, to said first person, information based on (a) one or more ratings of said rating target that have been provided by said first set of one or more raters, and (b) a differentiation of said first set of one or more raters from a second set of raters that do not stand in said relationship to said first person, wherein said information comprises a number based on said one or more ratings; and
performing a computation to generate said number, where said computation is based on each of said one or more ratings, and where said computation assigns, to each given rating, $r_i$, a weight, $w_i$, based on a degree of connection, $d_i$, between said first person and a rater that provided the given rating, wherein the weight, $w_i$, is a non-zero number for ratings provided by raters whose degree of connection to said person is n or less, and zero for ratings provided by raters whose degree of connection to said first person is greater than n, where n is a positive number, and wherein the weight is the same non-zero number for ratings provided by raters whose degree of connection is n or less, so that said number is equal to $\Sigma_i((r_i \cdot w_i)/s)$, where s equals either 1 or the total number of ratings, where $w_i=0$ for all $d_i>n$ and $w_i \neq 0$ for all $d_i \leq n$.

2. The method of claim 1, wherein said relationship comprises an n-or-fewer-degree connection between said first person and each rater in said first set, where n is two or greater.

3. The method of claim 1, wherein said rating target comprises a seller, and wherein said information comprises at least one of: (a) said one or more ratings, and (b) an aggregate of said one or more ratings that is not based on ratings provided by said second set of raters.

4. The method of claim 1, wherein said information comprises an identification of one or more items that are being offered for sale by one or more sellers that have been rated by raters in said first set, said rating target being one of said sellers.

5. The method of claim 1, wherein said rating target comprises an answerer of a question that said first person asks, wherein said one or more ratings rate said rating target's performance at answering said question, and wherein said information comprises: (a) said one or more ratings, and (b) an aggregate of said one or more ratings that is not based on ratings provided by said second set of raters.

6. One or more computer-readable storage devices comprising executable instructions to perform a method comprising:
identifying a first set of participants in a community that stand in a relationship to a first person and that have rated a rating target, wherein said rating target is an object, a thing, a service, a product, or a second person other than said first person;
communicating, to said first person, identities of at least some members of said first set;
communicating to said first person, information based on membership of said first set and on ratings that members of said first set have provided of said rating target, wherein said information comprises a number based on said ratings; and
performing a computation to generate said number, where said computation is based on each of said ratings, and where said computation assigns, to each given rating, $r_i$, a weight, $w_i$, based on a degree of connection, $d_i$, between said first person and a participant that provided the given rating, wherein the weight, $w_i$, is a non-zero number for ratings provided by participants whose degree of connection to said person is n or less, and zero for ratings provided by participants whose degree of connection to said person is greater than n, where n is a positive number, and wherein the weight is the same non-zero number for ratings provided by participants whose degree of connection is n or less, so that said number is equal to $\Sigma_i((r_i \cdot w_i)/s)$, where s equals either 1 or the total number of ratings, where $w_i=0$ for all $d_i>n$ and $w_i \neq 0$ for all $d_i \leq n$.

7. The one or more computer-readable storage devices of claim 6, wherein said relationship comprises an n-or-fewer-degree connection between said first person and each participant in said first set, where n is two or greater.

8. The one or more computer-readable storage media of claim 6, wherein said rating target is neither said first person nor any other person.

9. A system comprising:
one or more processors;
a first database that stores one or more ratings;
a second database that stores data concerning relationships among people;

software that executes on at least one of said one or more processors and that is stored in one or more data remembrance devices, that uses said first database and said second database to identify a first set of raters that stand in a relationship to a first person, and that communicate information to said first person, said information comprising a number based on said one or more ratings from said first database and on a differentiation of said first set of raters from a second set of raters that do not stand in said relationship to said first person, wherein said ratings are of a rating target that is an object, a thing, a service, a product, or a second person other than said first person, wherein the software performs a computation to generate said number, wherein said computation is based on those ones of said one or more ratings provided by raters in said first set, and where said computation assigns, to each given rating, $r_i$, provided by a rater in said first set, a weight, $w_i$, based on a degree of connection, $d_i$, between said person and a rater that provided the given rating, and wherein the weight, $w_i$, is a non-zero number for ratings provided by raters whose degree of connection to said person is n or less, and zero for ratings provided by raters whose degree of connection to said person is greater than n, where n is a positive number, and wherein the weight is the same non-zero number for ratings provided by raters whose degree of connection is n or less, so that said number is equal to $\Sigma_i((r_i \cdot w_i)/s)$, where s equals either 1 or the total number of ratings, where $w_i=0$ for all $d_i>n$ and $w_i \neq 0$ for all $d_i<n$.

10. The system of claim 9, wherein said relationship comprises an n-or-fewer-degree connection between said first person and each rater in said first set, where n is two or greater.

11. The system of claim 9, wherein said information comprises an aggregate that is based on ratings provided by said first set of raters and that is not based on ratings provided by said second set of raters.

12. The system of claim 9, wherein said information comprises an identification of one or more items that are being offered for sale by one or more sellers that have been rated by raters in said first set, and wherein said information excludes items offered for sale by raters in said second set.

13. The system of claim 9, wherein said relationship comprises membership of said first set of raters in a contacts list of said first person.

* * * * *